Inventor
Arthur L. Wallof
By Caswell & Lagaard
Attorneys

Patented Jan. 14, 1941

2,228,544

UNITED STATES PATENT OFFICE 2,228,544

ELECTRIC MACHINE

Arthur L. Wallof, Robbinsdale, Minn.

Application March 20, 1939, Serial No. 262,881

3 Claims. (Cl. 172—280)

My invention relates to rotary magnetic electric machines such as alternating current generators and synchronous motors and has for an object to provide a machine of such character which will not require a separate source of direct current for field excitation.

Another object of the invention resides in providing a machine of the character referred to in which field excitation is procured from the source of alternating current in the case of a synchronous motor and from the current developed by the generator in case of an alternating current generator.

Another object of the invention resides in providing a machine in which the alternating current used for field excitation is rectified through rotation of the rotor of the machine.

Another object of the invention resides in providing a mechanism for exciting the field of a motor or generator operating with or utilizing either single phase current or polyphase current.

A still further object of the invention resides in providing the machine with a stator and a rotor and in providing one thereof with an alternating current winding and the other with a field winding and in further providing rectifying means operated by the rotor for rectifying current from a source of alternating current and supplying the current to the field winding.

An object of the invention resides in utilizing a third winding inductively related to the alternating current winding and furnishing the alternating current to be rectified and supplied to the field winding.

A still further object of the invention resides in using a commutator for rectifying the alternating current, said commutator having one segment for each pole of the machine.

A still further object of the invention resides in utilizing one commutator for each phase.

A feature of the invention resides in providing inductive starting means on the member of the machine having the field winding for cooperation with the flux produced by the alternating current winding.

Other objects of the invention reside in the novel combination and arrangement of parts and in the details of construction hereinafter illustrated and/or described.

In the drawings:

Fig. 1 is a wiring diagram of an alternating current generator or synchronous motor illustrating an embodiment of my invention.

Fig. 2 is an across-the-line diagram of the structure shown in Fig. 1.

Figure 3:
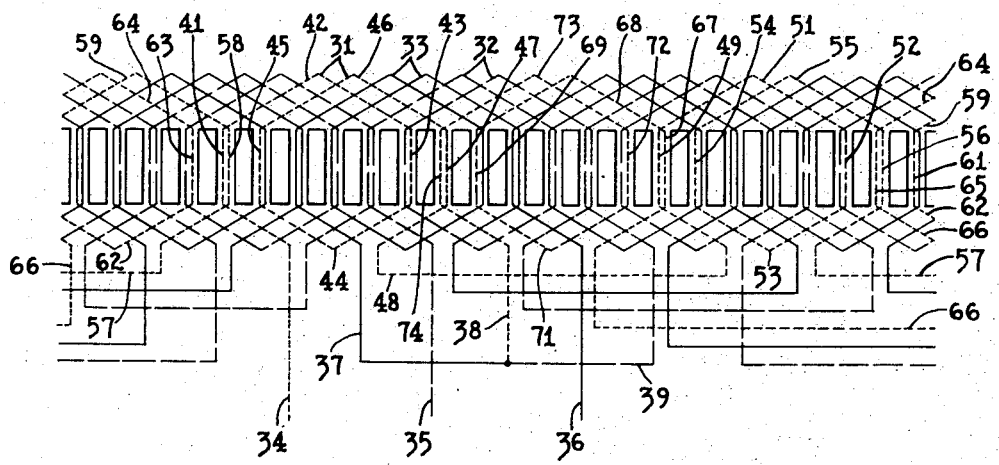
Fig. 3 is a wiring diagram of the alternating current windings of the invention.
Figure 4:
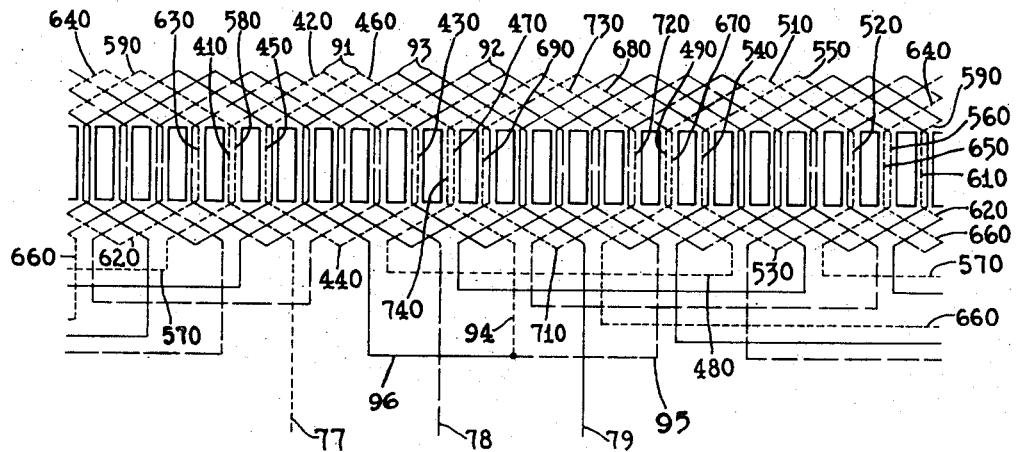
Fig. 4 is a view similar to Fig. 3 of the inductively related windings of the invention.

In the use of alternating current generators for farm lighting plants and similar small installations, and in the use of small alternating current motors a source of direct current for field excitation is required. This usually presents a problem which becomes more or less troublesome and which requires the addition of separate rectifiers or direct current generators or batteries which are highly undesirable and relatively expensive. The cost of such accessories frequently render the use of alternating current for farm lighting plants and synchronous motors for use in small installations prohibitive. The present invention provides an alternating current generator or synchronous motor which, in itself, is capable of producing rectified current for use for field excitation and which machine can be produced at a slightly greater cost than the ordinary machine so that the accessories heretofore may be entirely dispensed with.

Inasmuch as my invention may be embodied in either an alternating current generator or a synchronous motor or any other similar machine or device utilizing direct current, the invention will be broadly referred to as a synchronous rotating electric machine, which term will be intended to embrace all forms of the invention.

My invention utilizes a stator embodying a magnetic circuit coupled with a rotor forming a part of said magnetic circuit. One of these parts carries an alternating current winding and the other part carries a field winding which parts when the machine is running at synchronous speed, produces fluxes which react to procure propulsion in the case of a motor or generation of alternating current in the case of a generator. With my invention any type of rotor and stator, such as are well known in the art may be used and the illustration and description thereof will hence not be given in detail in this application. It can be readily comprehended that the alternating current winding may be placed either upon the stator or rotor and the field winding placed upon the other thereof. In the instant invention trical degrees from the brushes 98b, 97b and 99b.

The operation of the invention is as follows: In starting, the windings 31, 32 and 33 are energized from the line connected to the leads 34a, 35a and 36a. This sets up a rotating field in the core of the stator of the motor. Current is induced in the squirrel cage bars 14, 15, 16 and 17 and the rotor is brought up to a speed approaching synchronous speed. When the motor commences to operate, alternating current is supplied to the windings 10, 11 and 12 from the windings 91, 92 and 93 which have current induced in them from the current flowing through the windings 31, 32 and 33 in the manner of an ordinary transformer. These current pulses set up flux pulses in the rotor core but said pulses are changed so rapidly that they do not conform to the rotation of the rotating field in the stator core and have no effect on the starting of the motor. When the rotor rotates, the brushes co-acting with the commutators of the motor shift the flux produced by the rotor windings through an angle of one hundred eighty electrical degrees. When the rotor approaches synchronous speed, the frequency of the changes in current flow brought about by the brushes and commutator approaches the frequency of the current in the windings 31, 32 and 33. It will thus become apparent that, when the flux in the stator core changes in direction, due to the alternating current producing the flux, the fluxes in the rotor are correspondingly changed due to the movement of the brushes from one segment to the next segment. In this manner the fluxes in the rotor and core are always in the proper direction to produce torque and the motor then runs as a synchronous motor. When synchronous speed is reached, current ceases to flow through the squirrel cage bars 14, 15 and 16 and 17 and the motor operates as a synchronous motor. It will thus become apparent that no external source is necessary for supplying direct current to the motor and that field excitation is directly procured from the alternating current used in operating the motor. By adjusting the resistors 311, the power factor of the machine, when used as a motor, can be regulated and the voltage of the machine when used as a generator can be controlled.

The operation of an electrical machine utilizing my invention as a generator is simply the reverse of that disclosed in conjunction with the invention used as a motor. In the latter case power is applied to the shaft and alternating current generated which furnishes rectified excitation current for the field of the generator.

While I have explained the invention as having the field formed on the rotor and the alternating current windings disposed on the stator it can readily be comprehended that these windings may be reversed and the field formed on the stator and the alternating current windings disposed on the rotor.

Figure 6:
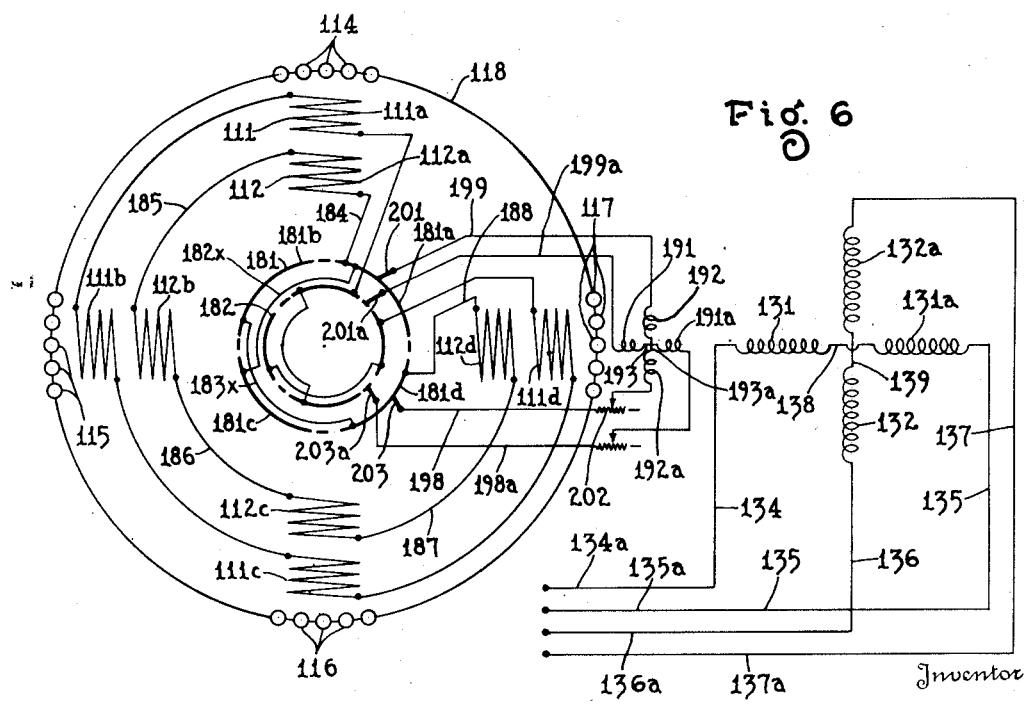
Fig. 6 is a view similar to Fig. 1 of the invention embodied in a quarter phase alternating current generator or synchronous motor.

My invention is equally as applicable to a motor or generator used with two-phase alternating current. In Fig. 6 I have shown a modification of the invention in which a motor or generator is disclosed capable of use in a two-phase circuit. The construction and connection of the various coils being identical with those disclosed in conjunction with the form of the invention shown in Fig. 1, the description of the parts will not be repeated and the same reference numerals preceded by the digit "1" will be used to designate corresponding parts. In this case, however, four inductive windings 131, 131a, 132 and 132a are used. The windings 131 and 131a are connected together by a conductor 138, while the windings 132 and 132a are connected together by conductor 139. The winding 131 is connected to a conductor 134. Winding 131a is connected to a conductor 135. Winding 132 is connected to a conductor 136 and the winding 132a is connected to a conductor 137. These conductors are connected to the leads 134a, 135a, 136a, and 137a of a suitable source of quarter-phase alternating current. With this form of the invention the exciter windings consist of windings 191, 191a, 192 and 192a. The windings 191 and 191a are connected together by a conductor 193. The windings 192 and 192a are connected together by a conductor 193a. The winding 192 is connected by a conductor 199 with a brush 201 engaging commutator 181. The winding 192a is connected to a conductor 198 which has in it a variable resistance 202. This conductor is connected to a brush 203 also riding on the commutator 181. The brushes 201 and 203 are disposed 180 electrical degrees apart. The windings 191 and 191a are connected in the same manner to the commutator 181.

Figure 5:
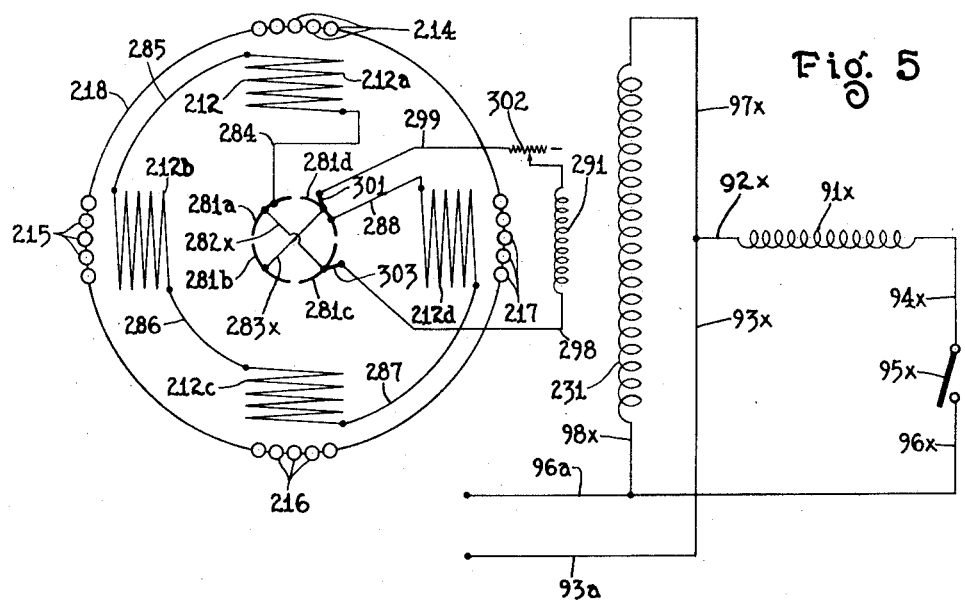
Fig. 5 is a view similar to Fig. 1 illustrating the invention embodied in a single phase alternating current generator or synchronous motor.

In Fig. 5 I have shown my invention as applied to a single-phase electric motor. The construction of the motor and the arrangement of the windings is similar to that shown in Fig. 1 and the description thereof will not be repeated. The corresponding parts will be designated by the same reference numerals preceded by the digit "2." However, in conjunction with this form of the invention, a split-phase starting winding 91x is employed which is connected by means of a conductor 92x to a conductor 93x, which in turn is connected to a lead 93a, connected to the source of power. This winding is further connected through a conductor 94x with a switch 95x, which in turn is connected through a conductor 96x with a lead 96a from the source of power. The main winding 231 is connected by means of conductors 97x and 98x with lead 96a and conductor 93x. The remainder of the motor is identical with that shown in Fig. 1 excepting that the additional windings, commutators and brushes required for the other two phases have been omitted.

My invention is highly advantageous in that an extremely simple and compact electrical machine is provided. With my invention no external source of direct current is required for field excitation. My invention is equally as applicable with either generators or motors. My invention may be used in single-phase or polyphase circuits.

Changes in the specific form of my invention, as herein disclosed, may be made within the scope of what is claimed without departing from the spirit of my invention.

Having described my invention, what I claim as new and desire to protect by Letters Patent is:

1. A synchronous rotating electrical machine comprising a stator member and a rotor member, one of said members having polyphase alternating current windings, the other thereof having a plurality of poles fixed relative thereto, a number of separate windings on each pole there being one winding on each pole for each phase, the corresponding windings on the various poles for each phase being connected in series, to form a number of groups of windings corresponding to the number of phases, a plurality of commutators corresponding in number to the number of phases, there being one commutator for each group of windings each commutator having a plurality of segments equal in number to the number of poles, alternate segments of each commutator being connected together to form in each commutator two sets of interconnected segments, each group of windings being connected to the respective sets of commutator segments of its commutator and being disconnected from the other commutators, a pair of brushes for each commutator, the brushes of each pair being disposed one hundred eighty electrical degrees apart, and exciter windings on the member having the alternating current windings, for energizing said field windings, said exciter windings being connected to said brushes.

2. A synchronous rotating electrical machine comprising a stator member and a rotor member, one of said members having polyphase alternating current windings, the other thereof having a plurality of poles fixed relative thereto, a number of separate windings on each pole there being one winding on each pole for each phase, the corresponding windings on the various poles for each phase being connected together to form a number of groups of windings corresponding to the number of phases, a plurality of commutators corresponding in number to the number of phases, there being one commutator for each group of windings, each commutator having a plurality of segments equal in number to the number of poles, alternate segments of each commutator being connected together to form in each commutator two sets of interconnected segments, each group of windings being connected to the respective sets of commutator segments of its commutator and being disconnected from the other commutators, a pair of brushes for each commutator, the brushes of each pair being disposed one hundred eighty electrical degrees apart, and exciter windings on the member having the alternating current windings, for energizing said field windings, said exciter windings being connected to said brushes.

3. A synchronous rotating electrical machine comprising a stator member and a rotor member, one of said members having polyphase alternating current windings, the other thereof having a plurality of poles fixed relative thereto, a number of separate windings on each pole there being one winding on each pole for each phase, the corresponding windings on the various poles for each phase being connected together to form a number of groups of windings corresponding to the number of phases, a plurality of commutators corresponding in number to the number of phases, there being one commutator for each group of windings, each commutator having a plurality of segments equal in number to the number of poles, alternate segments of each commutator being connected together to form in each commutator two sets of interconnected segments, each group of windings being connected to the respective sets of commutator segments of its commutator and being disconnected from the other commutators, a pair of brushes for each commutator, the brushes of each pair being disposed one hundred eighty electrical degrees apart, and means for supplying polyphase alternating current to said brushes.

ARTHUR L. WALLOF.

Jan. 14, 1941.  F. KUHN ET AL  2,228,571
TEMPERATURE REGULATING STAND FOR ELECTRICALLY HEATED TOOLS
Filed April 10, 1939
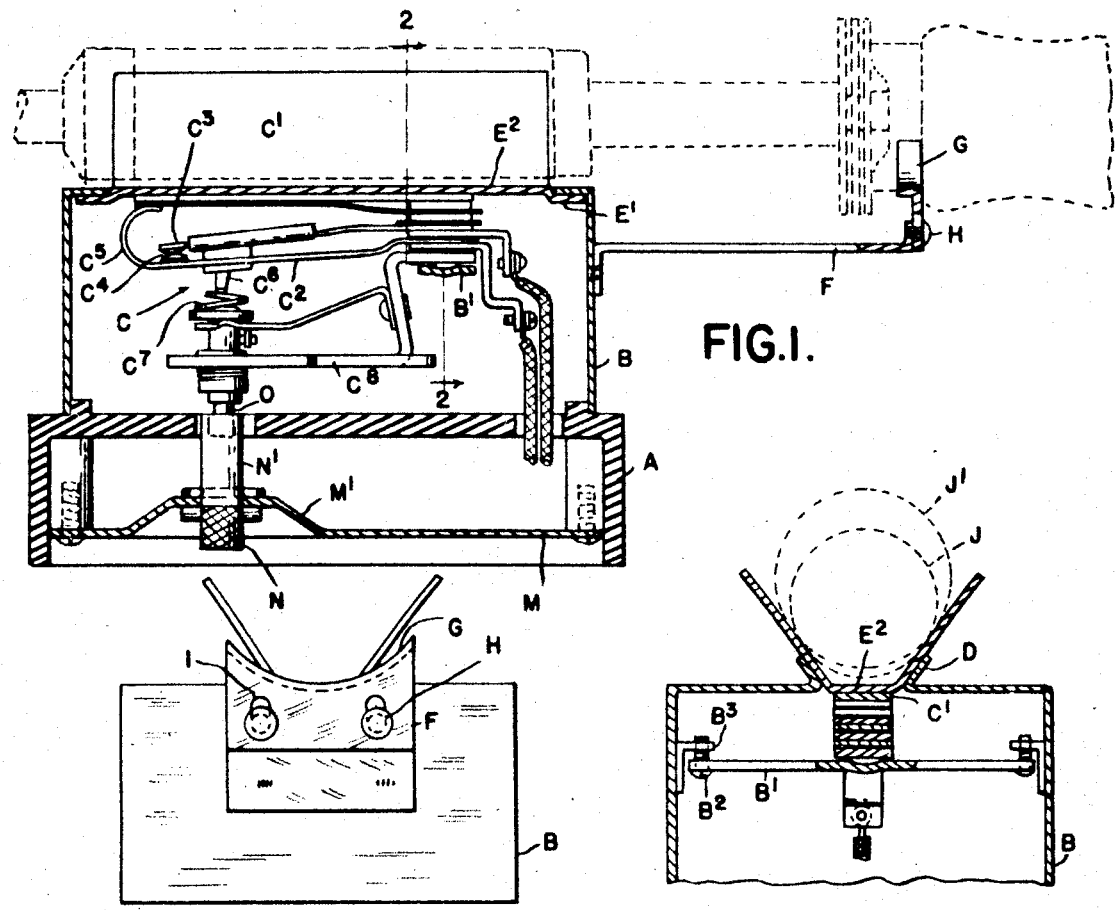
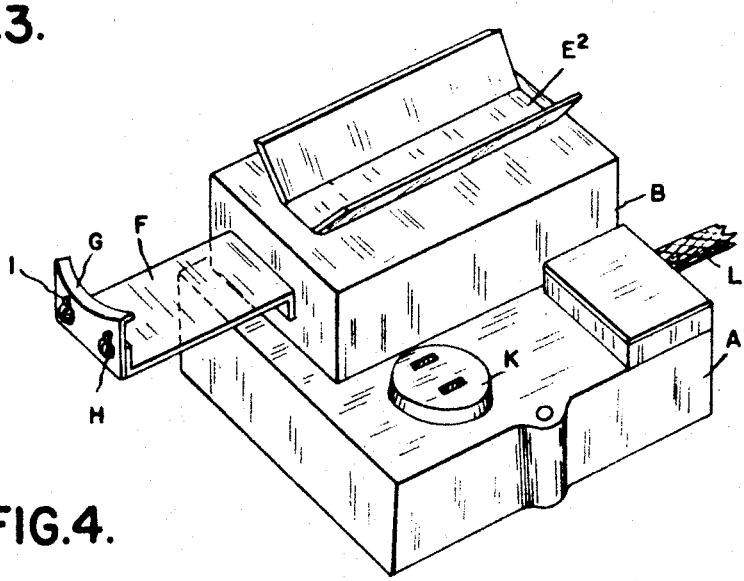
INVENTORS
FRANK KUHN
LAURENCE H. THOMAS
BY *Whittemore Hulbert & Belknap*
ATTORNEYS